United States Patent [19]

Rickert

[11] Patent Number: 4,545,047

[45] Date of Patent: Oct. 1, 1985

[54] CENTERING DEVICE FOR INTERCHANGEABLE DISK

[75] Inventor: David W. Rickert, Boulder, Colo.

[73] Assignee: Storage Technology Partners II, Louisville, Colo.

[21] Appl. No.: 575,416

[22] Filed: Jan. 31, 1984

[51] Int. Cl.⁴ .......................... G11B 3/70; G11B 5/82
[52] U.S. Cl. ..................................... 369/290; 369/270
[58] Field of Search ................ 369/270, 271, 289, 290

[56] References Cited

U.S. PATENT DOCUMENTS 3,706,085 12/1972 Mowrey et al. ..................... 369/270
4,166,622 9/1979 Rager ................................... 369/270

Primary Examiner—Steven L. Stephan
Attorney, Agent, or Firm—James R. Young

[57] ABSTRACT

A centering mechanism for centering the disk recording medium over the spindle of a rotating disk storage system is presented. The invention consists of a centerpiece in the disk having three or more fingers pointing in the direction of insertion and curved away from the center of the disk. As the disk is inserted over a tapered spindle, one side or the other of the fingers will contact the spindle and center the disk as it moves toward the tapered spindle. The bottom edge of the center hole of the disk is rounded to form a stop for the fingers. The fingers bend as the disk is inserted, and this stop ensures that the fingers will not bend too far and break. When the disk is fully inserted, all the fingers around the circumference of the hole are contacting the tapered spindle hub and are also bent back against the stop surface on the disk to provide good centering. As the disk is being moved to its final inserted position, the fingers scrape along the tapered spindle to clean the spindle and provide a clean contact surface between the fingers and the spindle.

3 Claims, 3 Drawing Figures

CENTERING DEVICE FOR INTERCHANGEABLE DISK

BACKGROUND OF THE INVENTION

This invention relates to centering mechanisms; and more particularly to a centering mechanism for centering the disk recording medium over the spindle of a rotating disk storage system. Even more particularly, this invention relates to a centering mechanism that uses resilient fingers; is self cleaning; and limits impact forces during insertion.

Disk recording media are used in the computer industry for storage of large amounts of data. The recording media may contain millions or billions of bytes of data which are accessible to the computer by means of a transducer which scans the data as it rotates at high speed relative to the transducer. The recording medium may be a ferromagnetic material having magnetic characteristics which make it suitable for reading or it may have optical characteristics which make it suitable for reading or it may have still other characteristics. In most instances the medium itself is somewhat fragile and although it typically rotates at high speed, the medium itself is not attached to a spindle, but instead is attached to and supported by a centerpiece which is then mounted on the spindle or other spinner mechanism of a motor.

The centerpiece must be accurately centered because data reading and writing transducers rely on the concentricity of the data tracks. While adjustments of the transducer are made by servos, the data tracks are centered at the geometric center of a centerpiece which should have its geometric center coincide with the geometric center of a spindle, usually driven by a motor. One condition which will prevent accurate centering is dirt or other contamination on the centerpiece or spindle.

Prior art mechanisms have used a cone to taper approach where the center hole in the disk is tapered to fit over the cone shaped spindle. This type of mechanism suffers from potential damage during insertion, since both the tapered disk surface and the cone are made of metal with no shock absorbing mechanism between them. It also suffers from dirt susceptibility, since the surfaces only touch when fully inserted, and there is no wiping effect to remove dirt or other contamination.

Another prior art mechanism is the use of a screw mounted in the center of the disk which is screwed into threads in the center of the spindle. While this mechanism solves the centering problem, it requires that the disk be manually mounted to the spindle from the top to allow the screw to be easily turned and so this mechanism is not useful then the disk must be inserted from the side of the disk storage device. Side mounting is the most common form used in the industry today.

Another prior art mechanism, disclosed in U.S. Pat. No. 4,166,622 is the use of compression cylinders mounted in indentations about the periphery of the center hole. This type of mechanism is expensive to manufacture since each cylinder is made separately and then assembled to the hub later.

Thus, there is need in the art for an improved centering mechanism for centering data storage disks on a spindle. The present invention addresses that need.

SUMMARY OF THE INVENTION

It is an object of the present invention to provide an improved centering mechanism for centering a disk on a spindle in a rotating disk storage system.

It is a further object of the present invention to provide such a mechanism that is self cleaning and limits the impact forces on the disk and spindle during insertion.

The above and other objects of the present invention are realized through the use of a centering mechanism that comprises a centerpiece in the disk having three or more fingers pointing in the direction of insertion and curved away from the center of the disk. As the disk is inserted over a tapered spindle, one side or the other of the fingers will contact the spindle and center the disk as it moves down over the tapered spindle. As the disk moves over the spindle the leading edge surface of the fingers wipe against the spindle to clean it. This wiping action and the bending of the fingers as the disk moves toward the fully inserted position absorb some of the impact force as the disk and spindle contact. The accuracy of centering is determined primarily by the machined taper on the spindle, thus reducing the cost of the removable media.

BRIEF DESCRIPTION OF THE DRAWINGS

The above and other objects, features, and advantages of the present invention will be more apparent from the following more particular description of the preferred embodiment presented in connection with the following drawings, wherein.

DESCRIPTION OF THE PREFERRED EMBODIMENT

The following is a description of the best presently contemplated mode of carrying out the present invention. This description is given only to illustrate the general principles of the invention and is not to be taken in a limiting sense. The true scope of the invention can be ascertained by reading the appended claims.

Figure 1:
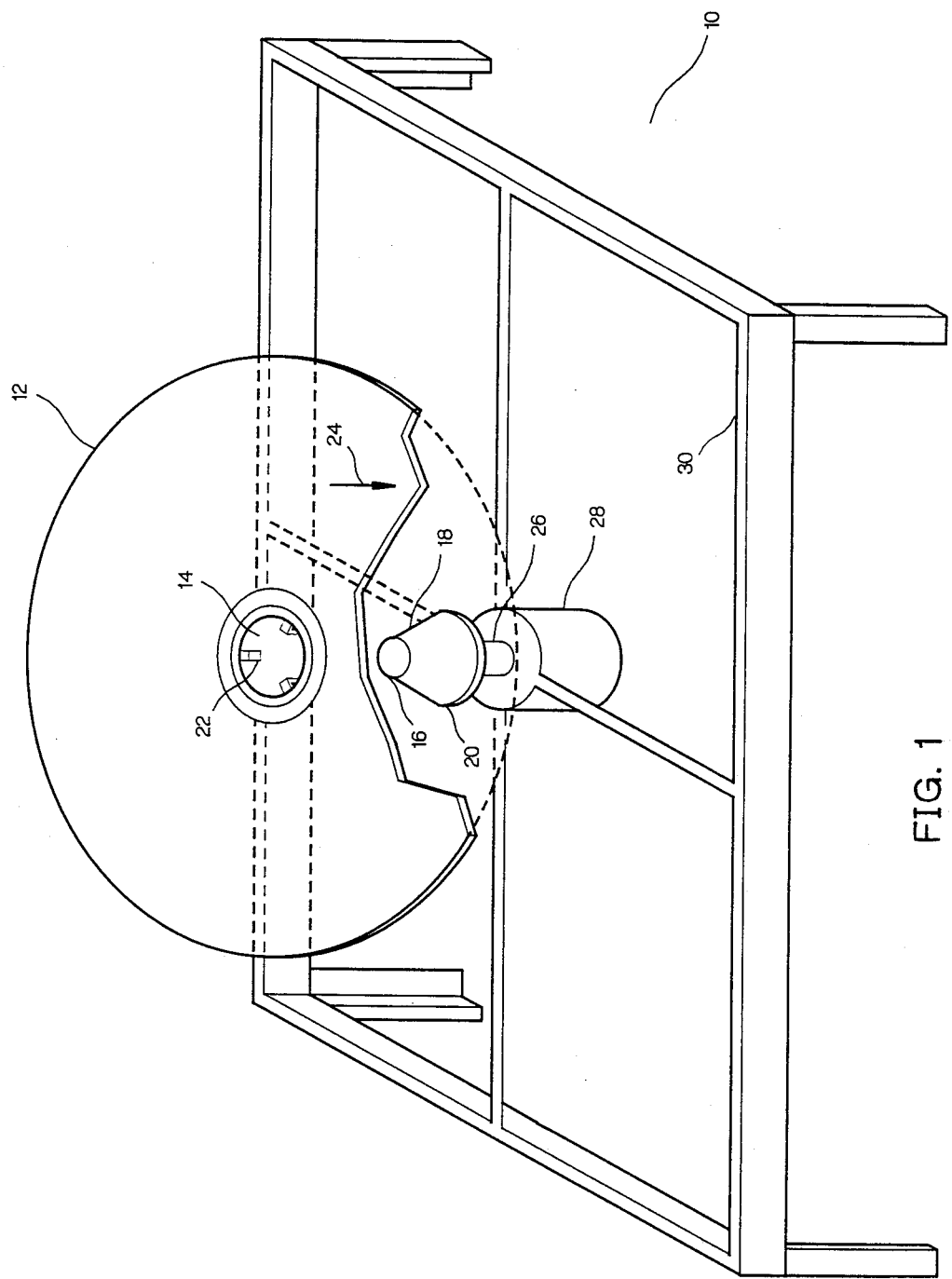
FIG. 1 depicts the environment in which the centering mechanism of the present invention is typically used.

FIG. 1 is a perspective view of a rotating disk storage system 10, and is shown to illustrate the environment in which the present invention would likely be used. A rotating disk 12 contains a center hole 14 with dimensions larger than the smaller diameter 16 of a tapered spindle 18, but smaller than the larger diameter 20 of the spindle 18. Fingers 22 are mounted to the inner surface of hole 14 and point in the direction of insertion which is shown by arrow 24. The spindle 18 is mounted on a shaft 26 which is mounted in a motor 28 used to rotate spindle 18. The motor 28 is attached to a frame 30 of the rotating disk storage system 10.

As the disk 12 is moved toward the spindle 18, one of the fingers 22 will contact the tapered surface of the spindle 18. As the disk 12 is moved further, this finger will move along the tapered surface of the spindle 18 thus bringing the center of the disk 12 over the center of the spindle 18. As the fingers 22 move along the surface of the spindle 18, a wiping action is performed and this wiping action serves to clean the surface of the spindle 18, so that when fully inserted, the fingers will rest against the clean surface of the spindle 18.

Figure 2:
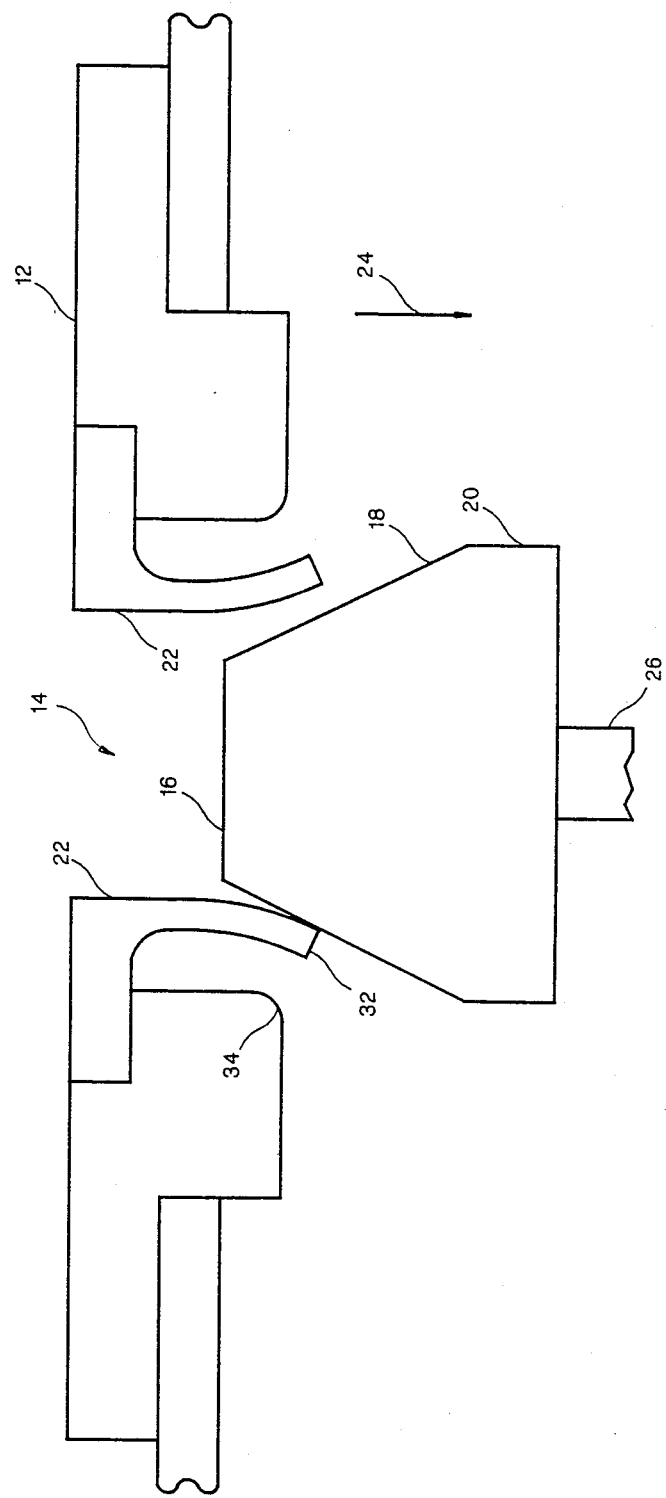
FIG. 2 depicts the centering mechanism and spindle as insertion is starting.

FIG. 2 shows a side schematic view of the disk 12 and spindle 18, as the disk 12 is being inserted over the spindle 18 in the direction indicated by arrow 24. In the position shown, the fingers 22 have just contacted the tapered surface of spindle 18. As disk 12 is moved further in the direction shown by arrow 24, the finger 22 will move along the tapered surface of spindle 18 causing the center of disk 12 to be brought into alignment with the center of the spindle 18. The forward surface 32 of fingers 22 wipes along the tapered surface of spindle 18 to clean the tapered surface of spindle 18, as the disk 12 moves further toward the fully inserted position. As this wiping action takes place, the fingers 22 bend away from the spindle 18 toward the curved edge 34 of the disk 12. The force required for this wiping action and the bending of the fingers 22 serves to limit the impact force of the disk 12 contacting the spindle 18.

Figure 3:
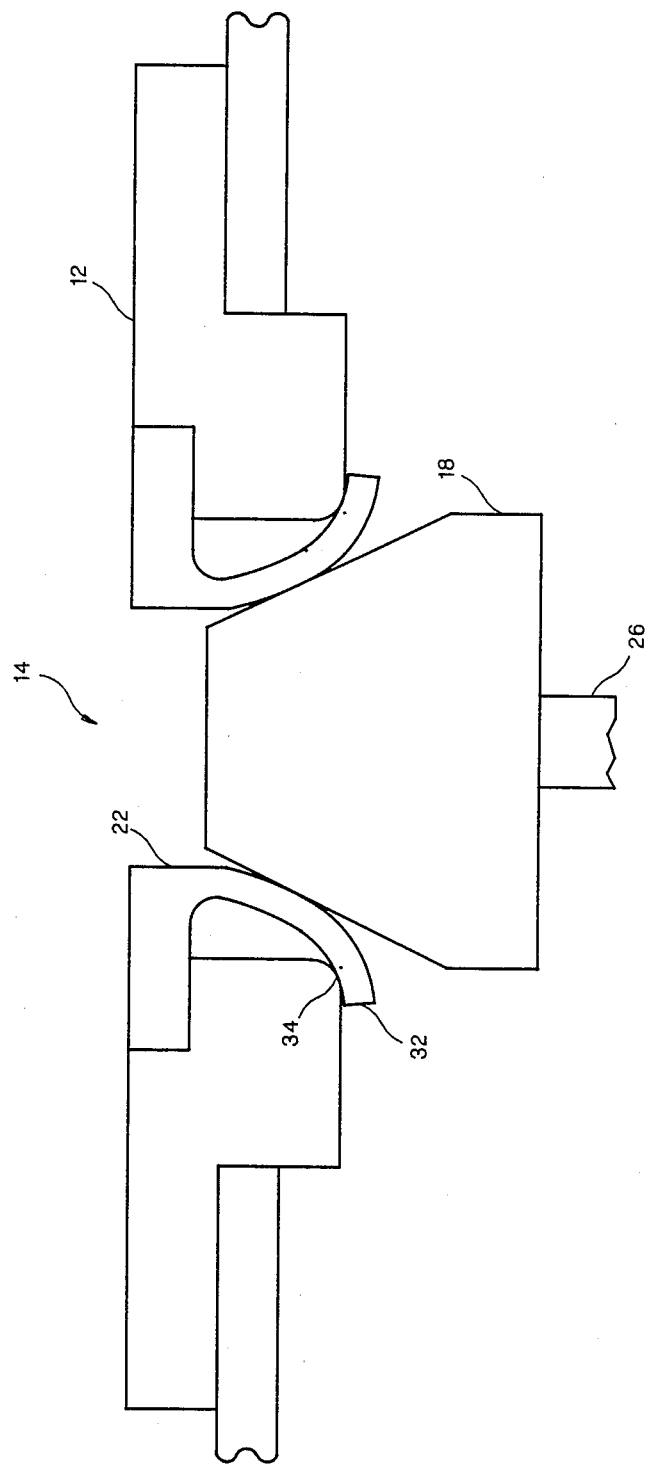
FIG. 3 depicts the centering mechanism and spindle after the disk is fully inserted.

FIG. 3 shows a side schematic view of the disk 12 and spindle 18 with the disk 12 in the fully inserted position. In this position the fingers 22 have been bent away from the spindle 18 to contact the curved surface 34 of the disk 12. The curved surface 34 acts as a stop to limit the travel distance of the fingers 22 to prevent them from breaking, and since all the fingers 22 are pushed back against the stop 34 when the disk 12 is fully inserted, good centering is provided.

What is claimed is:

1. Apparatus for centering a member on a rotating spindle comprising:
   an annular member having a central hole with dimensions greater than corresponding outside dimensions of said rotating spindle on which said annular member is intended to fit, and
   a plurality of resilient fingers attached to an inner surface of said central hole in said annular member, said fingers projecting into said central hole and said fingers being arc shaped with the curve of said arc being away from the center of said central hole, said fingers having a length sufficient to cause a forward portion of said fingers to contract said spindle as said annular member is first placed on said spindle and to slide along said spindle as said annular member is moved to a fully inserted position,
   whereby said fingers perform a wiping action along said spindle as said annular member is brought into contact with said spindle and after said annular member is fully inserted said fingers snugly contact a clean surface of said rotating spindle so that said annular member is centered on said rotating spindle.

2. The apparatus of claim 1 wherein said fingers are equally spaced in said central hole in said annular member.

3. The apparatus of claim 2 wherein the number of said fingers is at least three.

* * * * *